United States Patent
Glemarec et al.

(10) Patent No.: US 12,296,967 B2
(45) Date of Patent: May 13, 2025

(54) ASSEMBLY COMPRISING AN AIRCRAFT TURBINE ENGINE AND MOUNTING PYLON THEREOF

(71) Applicant: SAFRAN AIRCRAFT ENGINES, Paris (FR)

(72) Inventors: Guillaume Glemarec, Moissy-Cramayel (FR); Jean-Baptiste Vignes, Moissy-Cramayel (FR); Romuald Muriel Gentils, Moissy-Cramayel (FR); Valerio Capasso, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/260,923

(22) PCT Filed: Jan. 13, 2022

(86) PCT No.: PCT/FR2022/050074
§ 371 (c)(1),
(2) Date: Jul. 10, 2023

(87) PCT Pub. No.: WO2022/157443
PCT Pub. Date: Jul. 28, 2022

(65) Prior Publication Data
US 2024/0052781 A1 Feb. 15, 2024

(30) Foreign Application Priority Data
Jan. 21, 2021 (FR) ...................... 2100556

(51) Int. Cl.
*B64D 27/40* (2024.01)
*B64D 27/10* (2006.01)
*F02C 7/20* (2006.01)

(52) U.S. Cl.
CPC ........... *B64D 27/404* (2024.01); *B64D 27/10* (2013.01); *B64D 27/40* (2024.01); *B64D 27/402* (2024.01); *F02C 7/20* (2013.01)

(58) Field of Classification Search
CPC ...... B64D 27/404; B64D 27/10; B64D 27/40; B64D 27/402; F02C 7/20; F01D 25/04; F01D 25/28; F05D 2260/96
See application file for complete search history.

(56) References Cited

U.S. PATENT DOCUMENTS

| | | | |
|---|---|---|---|
| 4,717,094 A | 1/1988 | Chee | |
| 2019/0285029 A1 | 9/2019 | Nick et al. | |
| 2022/0120218 A1* | 4/2022 | Schelfaut | F02C 7/20 |

FOREIGN PATENT DOCUMENTS

| | | |
|---|---|---|
| FR | 2969700 A1 | 6/2012 |
| FR | 2987401 A1 | 8/2013 |
| FR | 3053661 A1 | 1/2018 |

OTHER PUBLICATIONS

International Search Report received for PCT Patent Application No. PCT/FR2022/050074, mailed on May 3, 2022, 5 pages (2 pages of English Translation and 3 pages of Original Document).

* cited by examiner

*Primary Examiner* — Todd E Manahan
*Assistant Examiner* — Rene D Ford
(74) *Attorney, Agent, or Firm* — WOMBLE BOND DICKINSON (US) LLP

(57) ABSTRACT

Assembly including an aircraft turbine engine and a pylon for mounting the turbine engine to an element of the aircraft. The pylon includes members for suspending the turbine engine, the members being connected to the turbine engine in at least one plane which is perpendicular to the axis and which is located upstream of the combustion chamber of the turbine engine, such that the turbomachine is cantilevered to (Continued)

the pylon, The assembly further includes at least one damper which connects the turbomachine to the pylon and which is located in a plane perpendicular to the axis located downstream of the combustion chamber, the damper being configured to limit the relative movements between the turbine engine and the pylon without transmitting force.

10 Claims, 9 Drawing Sheets

[Fig.1]
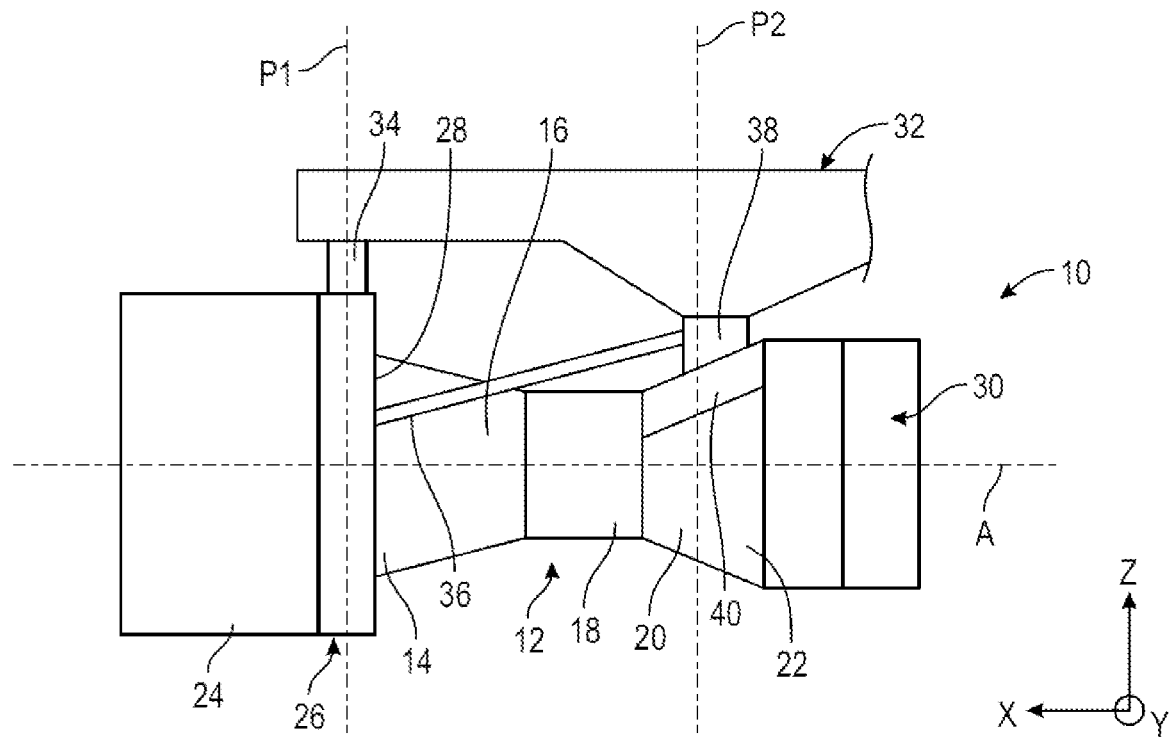
[Fig.2]
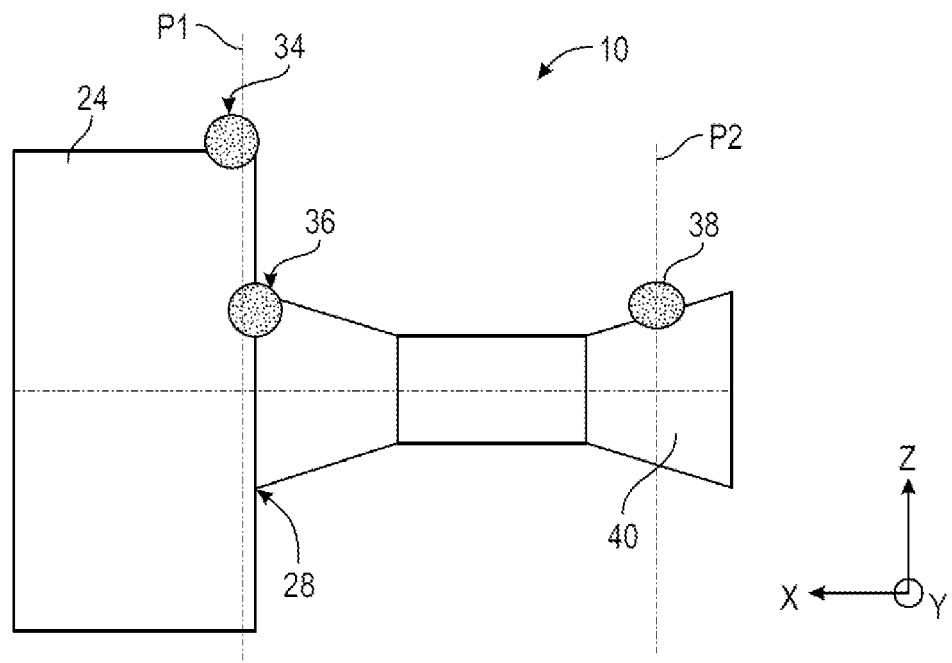

[Fig.3]
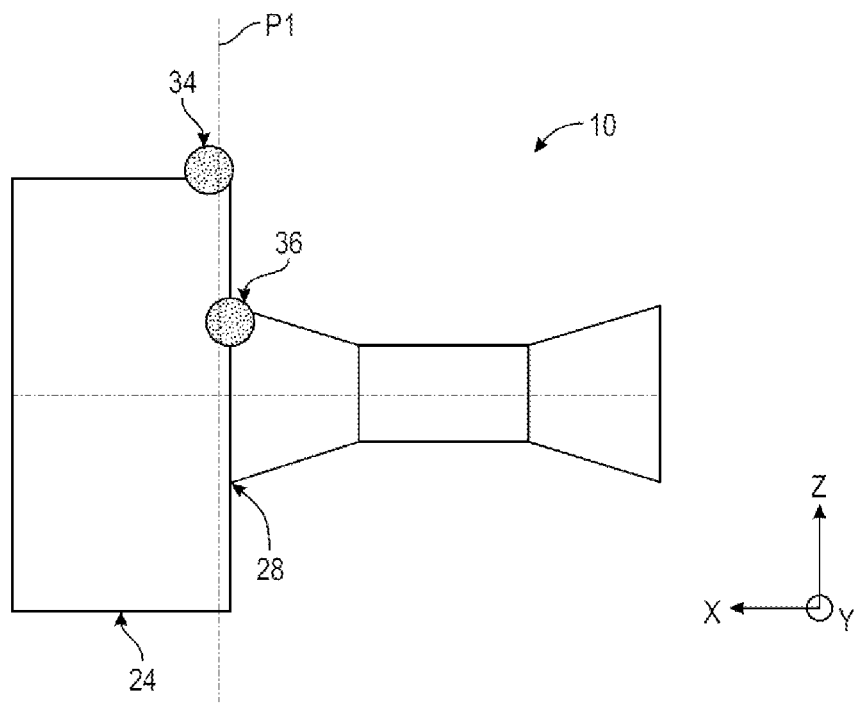
[Fig.4]
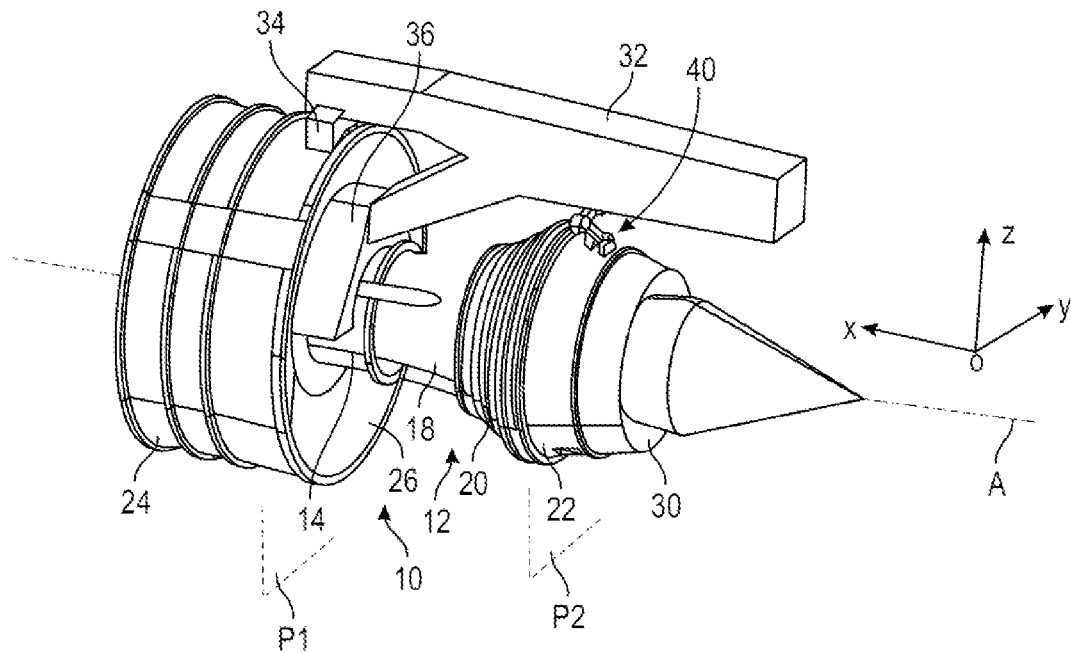

[Fig.5]
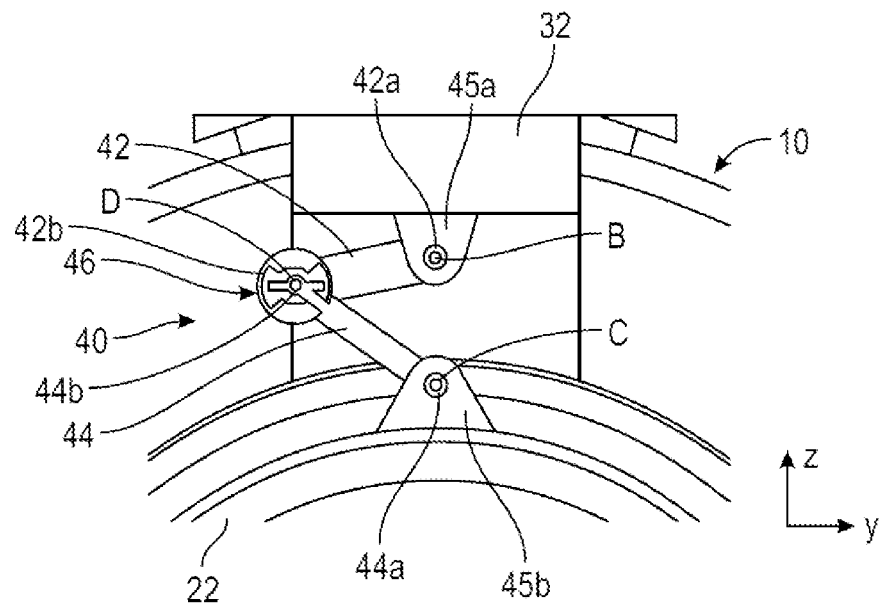
[Fig.6]
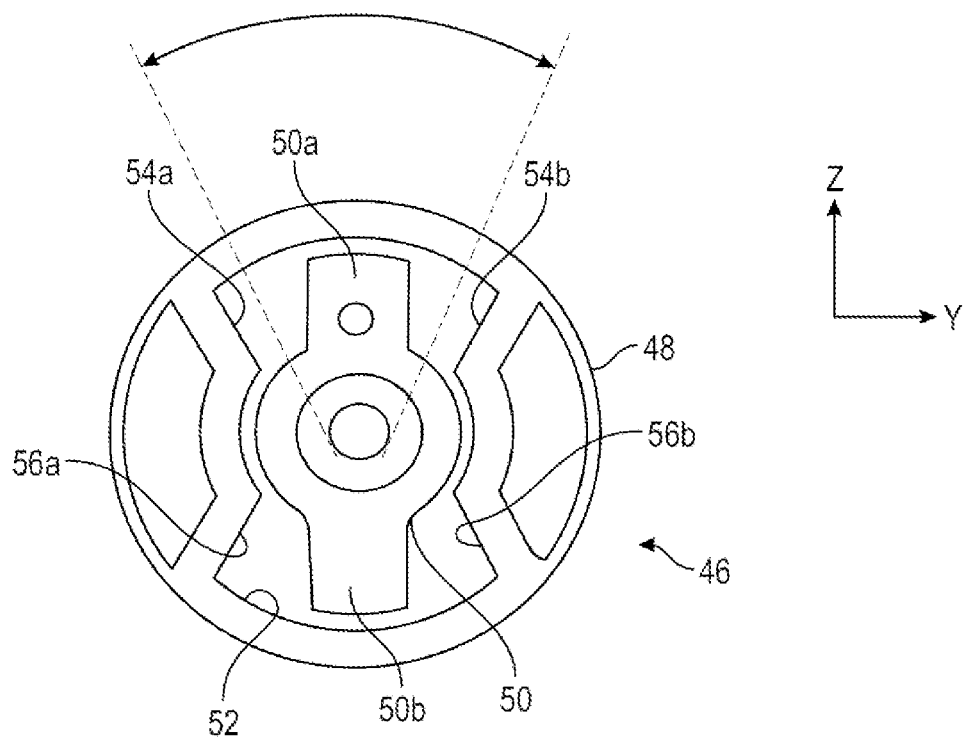

[Fig.7]
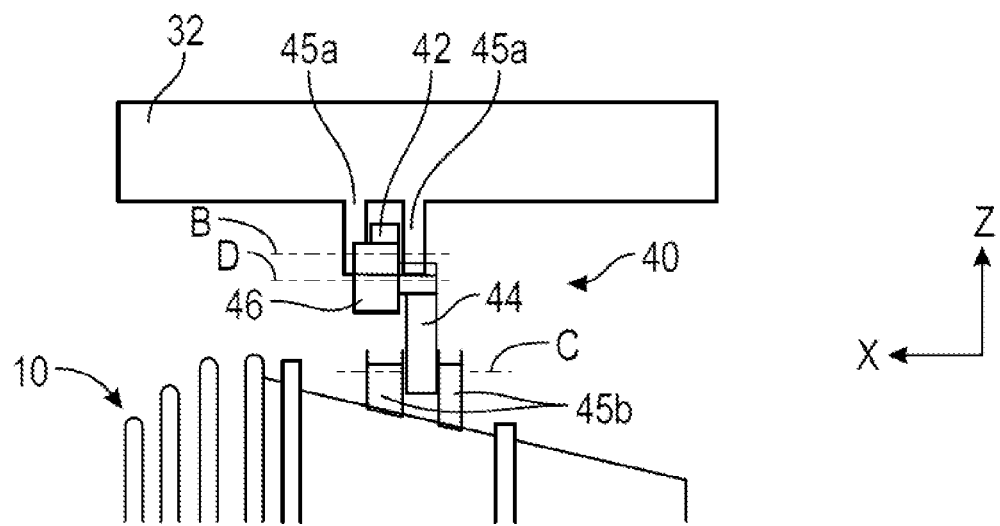
[Fig.8]
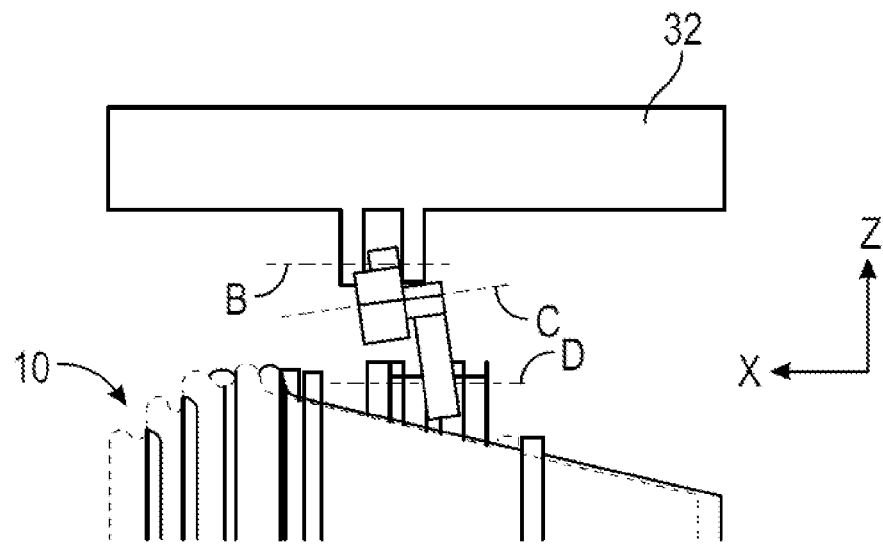

[Fig.9a]
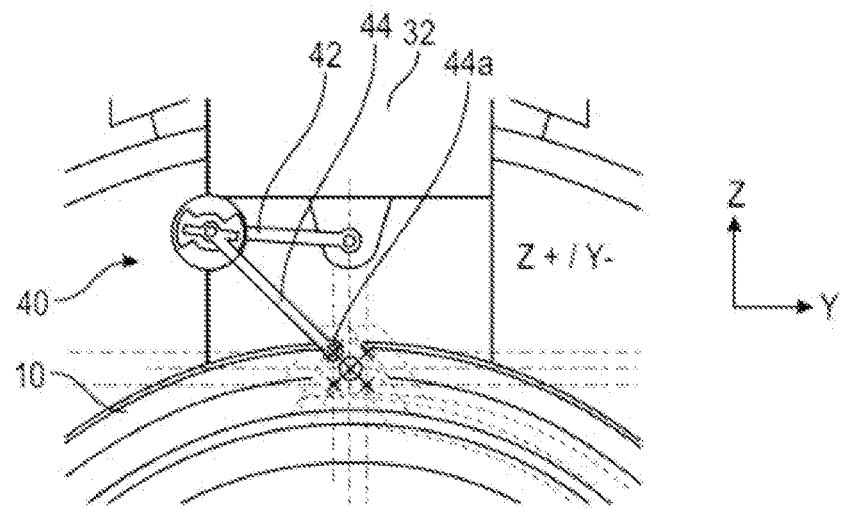
[Fig. 9b]
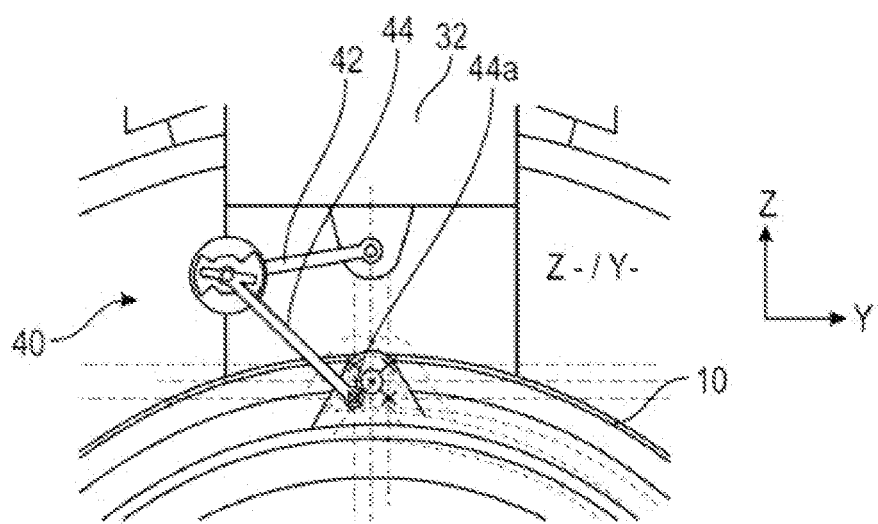

[Fig.9c]
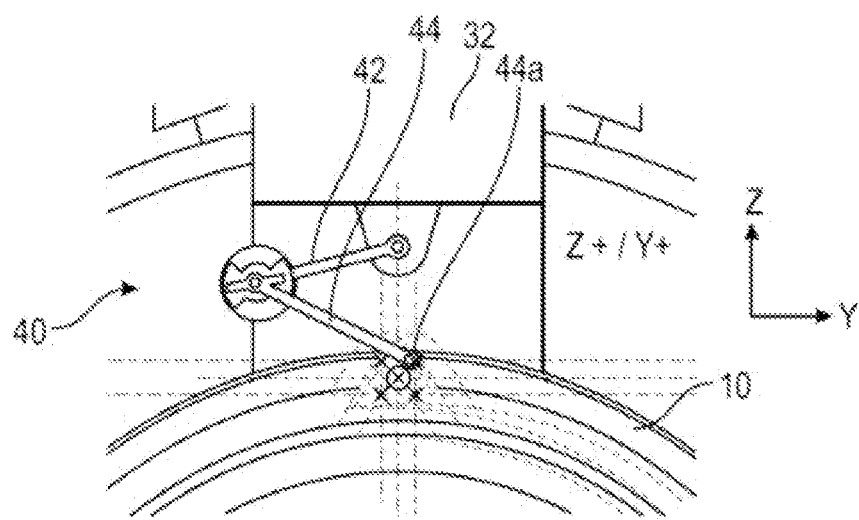
[Fig. 9d
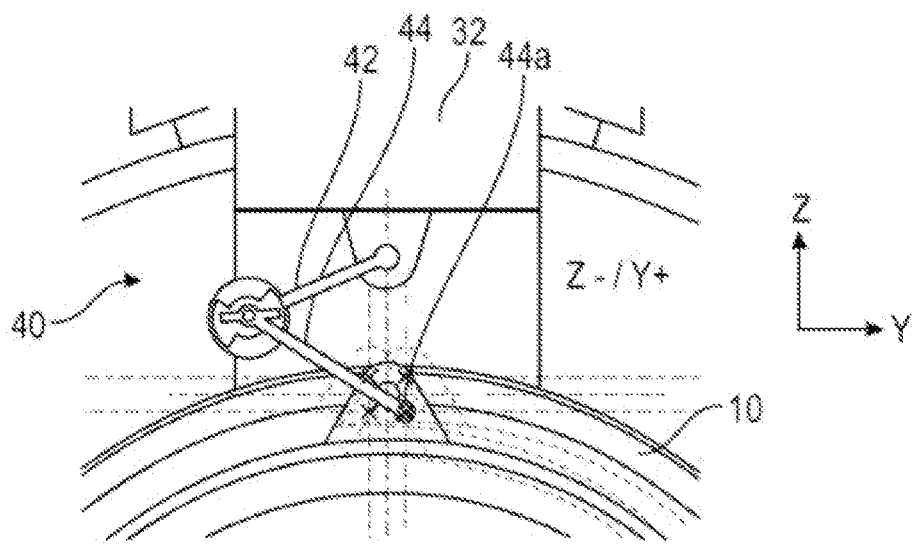

[Fig.10a]
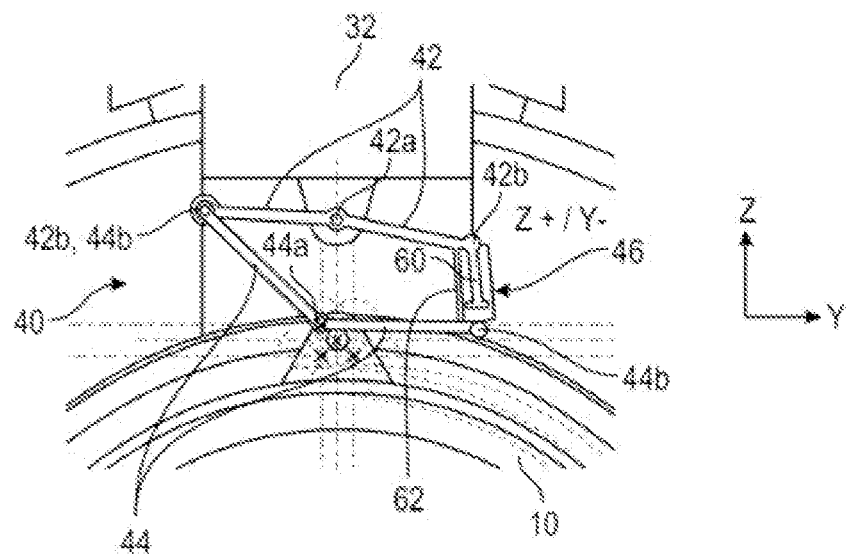
[Fig. 10b]
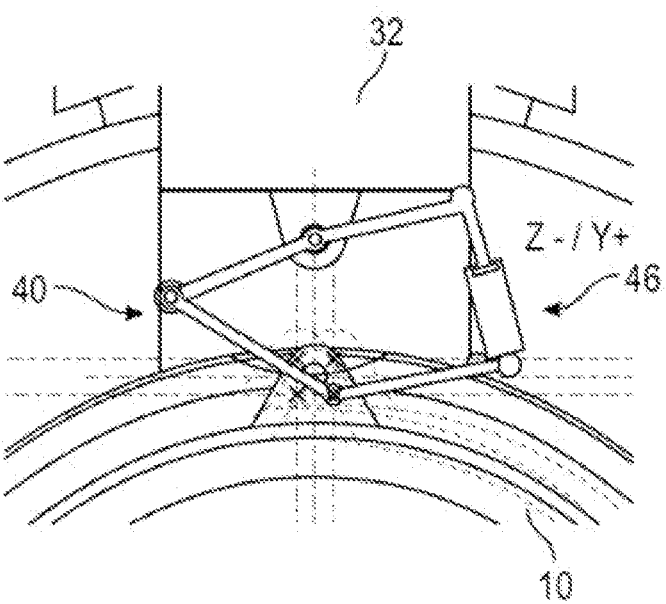

[Fig.11a]
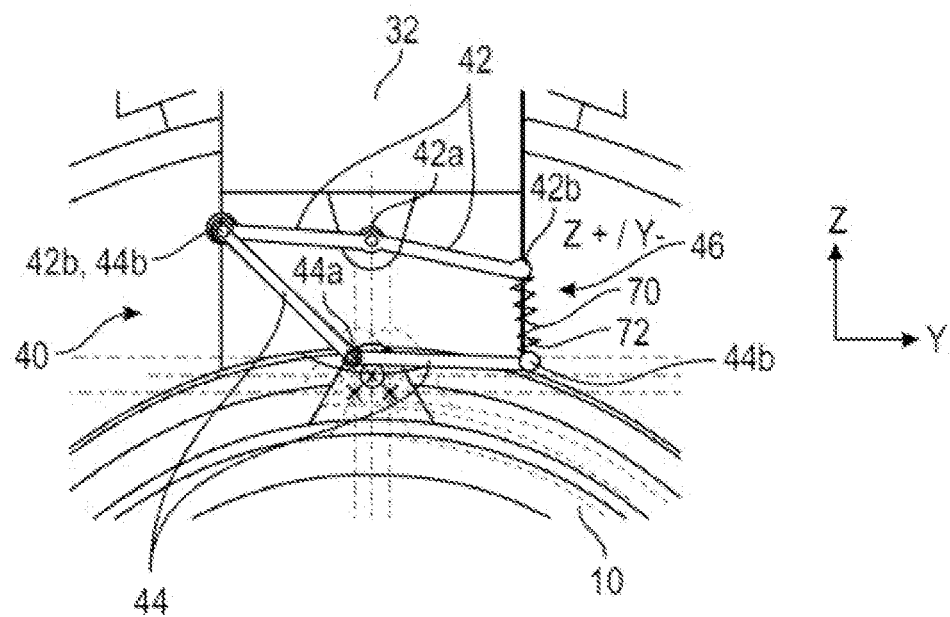
[Fig. 11b]
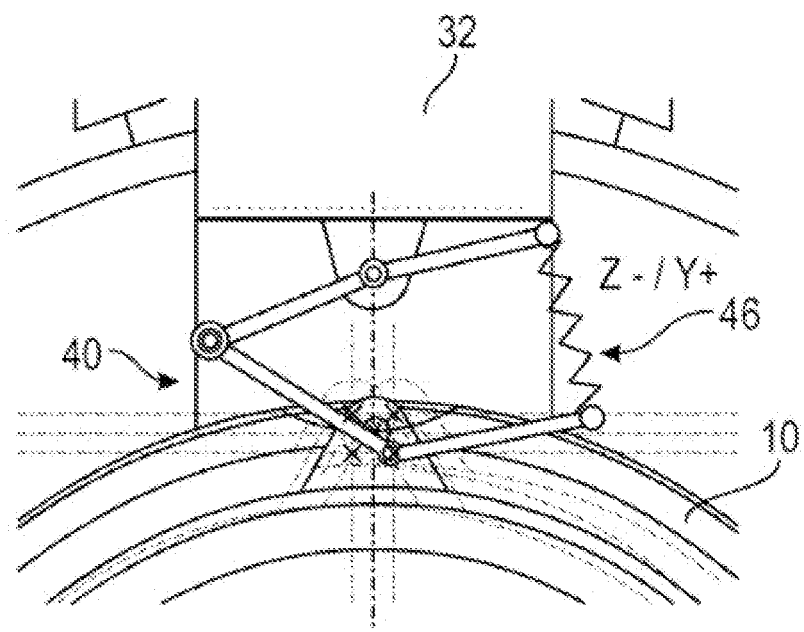

[Fig.12]
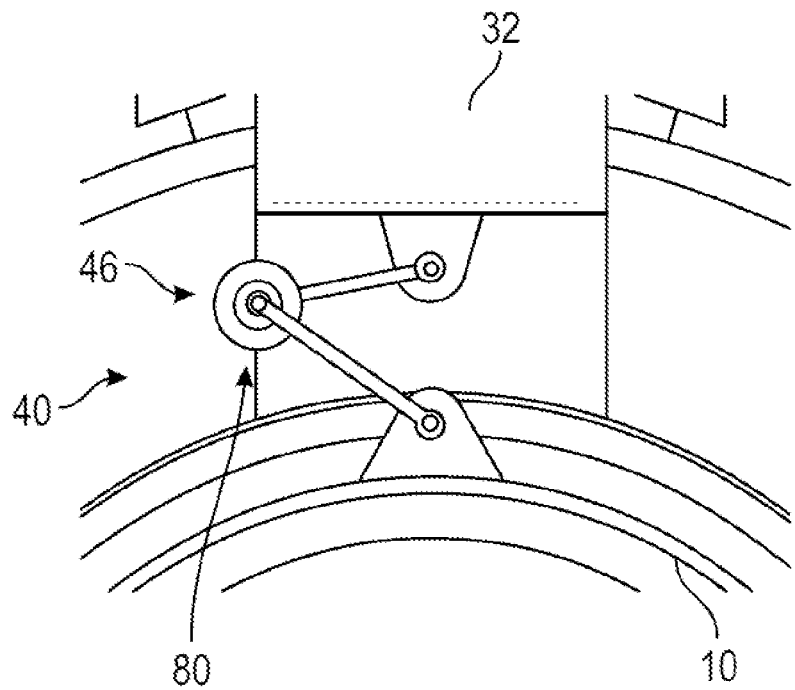
[Fig.13]
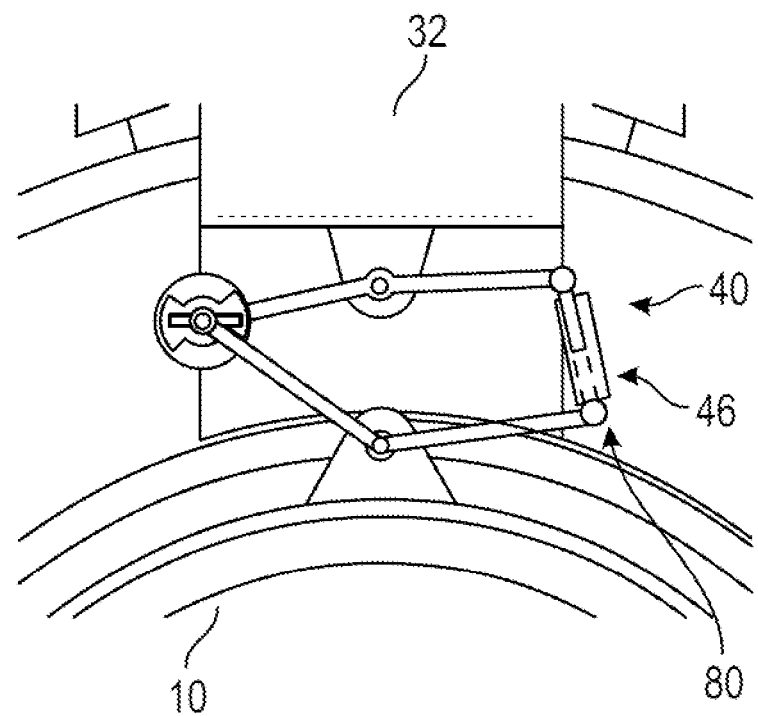

… (1)

ASSEMBLY COMPRISING AN AIRCRAFT TURBINE ENGINE AND MOUNTING PYLON THEREOF

TECHNICAL FIELD OF THE INVENTION

This invention relates to an assembly comprising an aircraft turbine engine and its mounting pylon.

TECHNICAL BACKGROUND

The prior art comprises in particular the documents FR-A1-2 969 700, FR-A1-2 987 401 and FR-A1-3 053 661.

An aircraft turbine engine comprises a gas generator which typically comprises, from upstream to downstream, with reference to the flowing of the gases in the turbine engine, at least one compressor, an annular combustion chamber and at least one turbine. In the case of a low-pressure and high-pressure turbofan engine with double body, the gas generator comprises a low-pressure compressor, a high-pressure compressor, the combustion chamber, the high-pressure turbine and the low-pressure turbine. The gas generator defines an annular flow duct for a gas flow that passes through the compressors, the combustion chamber and the turbines.

The rotor of the high-pressure compressor is connected to the rotor of the high-pressure turbine by a high-pressure shaft. The rotor of the low-pressure compressor is connected to the rotor of the low-pressure turbine by a low-pressure shaft which passes through the high-pressure shaft and which drives in rotation a propulsion propeller located generally upstream of the gas generator.

When this propeller is faired and therefore surrounded by an annular casing, this propeller is referred to as a fan and generates an air flow that flows around the gas generator. When the propeller is not faired, it also generates an air flow that flows around the gas generator.

The turbine engine is attached to an element of the aircraft, such as a wing or the fuselage, by means of a mounting pylon also referred to as mast. This pylon is generally elongated in shape and comprises a beam extending parallel to the longitudinal axis of the turbine engine. If the turbine engine is attached under a wing of the aircraft, the pylon is located at 12 o'clock (12 hours) by analogy with the face of a clock.

In the current technique, the pylon comprises upstream suspension members of the turbine engine and downstream suspension members of the turbine engine. However, this configuration causes its disadvantages. During operation, the gas generator ensures a transmission of the stresses between the upstream and downstream attachment points on the pylon, resulting in deformation of the generator and the gas and in changes to the clearances between the rotors and the stators of the gas generator. The gas generator is therefore subject to a moment generated by the axial stresses (off-axis thrust and thrust recovery). The turbine engine is also subject to a moment generated by the asymmetry of axial stresses on the vanes of the fan propeller, and to stresses resulting from the capture of air (sleeve stresses) by the turbine engine.

It is therefore understandable that the performance and the operability of the turbine engine may be affected by these stresses.

One solution to this problem is to attach in a cantilever manner the turbine engine to the pylon. This means suspending a front or upstream portion of the turbine engine to the pylon and leaving the rear or downstream portion of the turbine engine, such as its turbine casing, free.

However, the mounting of the turbine engine in a cantilever manner has its disadvantages:

There is no longer any support for the rear portion of the turbine engine, and therefore no stop if the turbine engine displaces too far;

This cantilevered portion will have a bending mode rotating at a relatively low frequency which can be excited by unbalanced loads and in particular unbalanced loads due to the loss of a fan vane;

The loads associated with the loss of a low-pressure turbine vane will be transmitted along the entire line of the cantilevered casing, resulting in significant loads and vibrations at the base of the cantilever, as well as major displacements, in particular at the downstream end of the turbine engine;

Problems with casings and casing-related items of equipment; etc.

The present invention proposes an improvement on current technologies, which allows to solve at least some of the problems and disadvantages mentioned above.

SUMMARY OF THE INVENTION

The invention relates to an assembly comprising an aircraft turbine engine and a pylon for mounting the turbine engine to an element of the aircraft, the turbine engine having a longitudinal axis and comprising a gas generator comprising, from upstream to downstream, in the flowing orientation of the gases, at least one compressor, an annular combustion chamber and at least one turbine, the pylon having a generally elongate shape along said axis and comprising members for suspending the turbine engine, these members being connected to the turbine engine in at least one plane which is perpendicular to the axis and which is located upstream of the combustion chamber so that the turbine engine is attached in a cantilever manner to the pylon, characterised in that it further comprises at least one damper which connects the turbine engine to the pylon and which is located in a plane perpendicular to the axis located downstream of the combustion chamber, this damper being configured to limit the relative displacements between the turbine engine and the pylon without transmitting stresses.

The invention thus proposes to dampen the rear or downstream portion of a turbine engine mounted in a cantilever manner by its front or upstream portion to a pylon. Although this damper is located downstream of the turbine engine, and in particular downstream of the combustion chamber, the purpose of this damper is not to transmit stresses from the turbine engine towards the pylon, but only to dampen and limit the relative displacements and vibrations of the turbine engine during operation. The damper therefore forms a flexible connection as opposed to a conventional suspension member which forms a rigid connection.

The assembly according to the invention may comprise one or more of the following characteristics, taken alone from each other, or in combination with each other:

said damper is configured to limit the displacements (between the turbine engine and the pylon) without transmission of stresses in said plane over a first predetermined stroke in a first direction contained in said plane, and over a second predetermined stroke in a second direction contained in said plane and perpendicular to the first direction, and to block any displacement of the turbine engine relative to the pylon beyond these strokes with transmission of stresses; in order to avoid excessive displacements of the turbine engine, beyond certain displacement strokes of the turbine engine, the latter is blocked by the damper, which then ensures a transmission of stresses between the turbine engine and the pylon; the damper thus has a different role depending on the operation of the turbine engine; in normal operation, it has the role of a conventional damper (or flexible connection) and in ultimate operation, it has the role of transmitting stresses (or rigid connection);

the damper comprises at least two links, a first link comprising a first end hinged to the pylon and a second link comprising a first end hinged to the turbine engine, the first and second links comprising second ends that are connected together by a damping device, the first and second ends of the links having hinge or connection axes that are substantially parallel to each other and to the longitudinal axis of the turbine engine;

the first ends of the links are connected by swivel connections to the pylon and to the turbine engine respectively;

the damping device is of the pallet type and comprises a cage secured to one of the first and second links, and a pallet secured to the other of the first and second links, the pallet being able to rotate in a cavity of the cage, which is filled with a damping liquid;

the damping liquid is a non-Newtonian liquid;

the damping liquid is a Newtonian liquid;

the cavity of the cage comprises stops configured to limit the angular deflection of the pallet in the cavity;

the pallet comprises two diametrically opposed ears configured to bear on said stops;

the damping device is of the piston or spring type;

the damping device is equipped with a movement sensor.

BRIEF DESCRIPTION OF THE FIGURES

Further characteristics and advantages of the invention will become apparent from the following detailed description, for the understanding of which reference is made to the attached drawings in which:

FIG. 1 is a very schematic view of an assembly comprising an aircraft turbine engine and its mounting pylon, according to the technique prior to the invention;

FIG. 2 is a very schematic view of an aircraft turbine engine and shows the attachment and suspension points on a mounting pylon, according to the technique prior to the invention;

FIG. 3 is a very schematic view of another aircraft turbine engine and shows attachment and suspension points on a mounting pylon, according to the technique prior to the invention;

FIG. 4 is a schematic perspective view of an assembly according to the invention comprising an aircraft turbine engine and its mounting pylon;

FIG. 5 is a schematic front view of a damper according to a first embodiment of the invention;

FIG. 6 is a schematic view of a pallet-type damping device for the damper shown in FIG. 5;

FIG. 7 is a schematic side view of the damper shown in FIG. 4;

FIG. 8 is a similar view to FIG. 7 and illustrates with FIG. 7 the ability to displace and to articulate of the damper;

FIGS. 9a and 9b are similar views to FIG. 5 and show two extreme positions of the damper respectively;

FIGS. 9c and 9d are similar views to FIG. 5 and show two other extreme positions of the damper respectively;

FIGS. 10a and 10b are similar views to those of FIGS. 9a and 9d and illustrate a variant embodiment;

FIGS. 11a and 11b are views similar to those of FIGS. 9a and 9d and illustrate another variant of embodiment;

FIG. 12 is a similar view to FIG. 5 and illustrates a further variant of the invention;

and

FIG. 13 is similar to FIG. 5 and illustrates another variant of the invention.

DETAILED DESCRIPTION OF THE INVENTION

FIG. 1 shows a turbine engine 10 for an aircraft, this turbine engine 10 being a turbofan engine with double flow and double body.

The axis A is the longitudinal axis of the turbine engine. The orthonormal reference frame XYZ is shown in some figures, including FIG. 1. The direction X is parallel to the axis X and oriented towards the upstream or the front of the turbine engine 10, the axis Z is oriented upwards, and the axis Y is oriented towards one side.

The turbine engine 10 comprises a gas generator 12 which comprises, from upstream to downstream with reference to the flowing of the gases along the axis A, a LP or low-pressure compressor 14, a HP or high-pressure compressor 16, an annular combustion chamber 18, a HP or high-pressure turbine 20 and a LP or low-pressure turbine 22.

Although not visible in FIG. 1, the rotor of the HP compressor 16 is connected to the rotor of the HP turbine 20 by a high-pressure shaft, and the rotor of the LP compressor 14 is connected to the rotor of the LP turbine 22 by a low-pressure shaft which passes through the high-pressure shaft and which drives in rotation a propulsion propeller located upstream of the gas generator 12 and which is surrounded by an annular casing referred to as the fan casing 24.

The fan casing 24 is connected to the gas generator 12 by an intermediate casing 26 which comprises a central hub 28 and a series of radial arms connecting the hub 28 to the fan casing 24.

The gas generator 12 defines a main annular flow duct for a first air flow, referred to as the primary flow. The gas generator is surrounded by a secondary annular flow duct for a second air flow, referred to as the secondary flow.

The air flow entering the fan is divided into one portion forming the primary flow. The air in this primary flow is compressed in the LP 14 and HP 16 compressors, then mixed with fuel and burnt in the combustion chamber 18. The combustion gases from the primary flow are then expanded in the HP 20 and LP 22 turbines and finally flow into an exhaust nozzle 30.

The other portion of the air flow entering the fan forms the secondary flow and is intended to be mixed with the primary flow downstream of the nozzle 30.

The turbine engine 10 is attached to an element of the aircraft by means of a pylon 32, which has a generally elongated shape along the axis A and which comprises members 34, 36, 38 for attaching and suspending the turbine engine 10.

FIGS. 1 to 3 illustrate the prior art prior to the present invention.

In the first case illustrated in FIGS. 1 and 2, there are three points or areas where the pylon 32 is attached to the turbine engine 10. Two of the points are located in an upstream or front plane P1 perpendicular to the axis A and the last point is located in a downstream or rear plane P2 perpendicular to the axis A.

At the level of the plane P1, a first attachment member 34 ensures the connection of the pylon 32 to the fan casing 24. At the level of the plane P2, the attachment member 38 ensures the attachment of the pylon 32 to a turbine or exhaust casing 40. This attachment member 38 is also connected by thrust recovery bars 36 to the hub 28 of the intermediate casing 26. These bars 36 ensure the transmission of the thrust from the turbine engine 10 to the pylon 32 and therefore to the aircraft.

In the second case shown in FIG. 3, there are only the two attachment points in the aforementioned plane P1, so the turbine engine is attached in a cantilever manner to the pylon 32. In this case, at the level of the plane P1, the attachment member 34 ensures the connection of the pylon 32 to the fan casing 24, and thrust recovery links 36 ensure the connection of the hub 28 of the intermediate casing 26 to the pylon 32, by means of an attachment member (not shown) which is attached to the pylon without being attached to the turbine engine.

FIG. 4 schematically illustrates the general principle of the invention, which is to provide, in addition to the suspension members 34, 36 of the turbine engine 10 which are located upstream of the combustion chamber 18, at least one damper 40 which connects the turbine engine 10 to the pylon 32 and which is located downstream of the combustion chamber 18.

The members 34 and 36 absorb the loads in the directions Y and Z and the moments Mx, My and Mz in all directions. The thrust of the turbine engine in the direction X is recovered by a system integrated to the members 34 or 36 or independent of them.

The damper 40 extends in a plane P2 which is perpendicular to the axis A and which passes, for example, through a turbine or exhaust casing of the turbine engine 10. The damper 40 is configured to limit the relative displacements between the turbine engine 10 and the pylon 32 without transmitting stresses, as will be explained below.

FIGS. 5 to 9d illustrate a first embodiment of the damper 40, in this case of the pallet type.

The damper 40 comprises at least two links 42, 44. A first link 42 comprises a first end 42a articulated on a clevis 45a of the pylon 32 and the second link 44 comprises a first end 44a articulated on a clevis 45b of the turbine engine 10.

The links 42, 44 comprise second ends 42b, 44b which are connected together by a damping device 46. As can be seen in FIGS. 7 and 8, the ends 42a, 42b, 44a, 44b of the links 42, 44 have axes of articulation or connection B, C, D substantially parallel to each other and to the longitudinal axis A of the turbine engine 10, in particular in the rest position visible in FIG. 7.

The ends 42a, 44a of the links 42, 44 are preferably connected by swivel connections to the pylon 32 and to the turbine engine 10 respectively, so that the damper 40 can allow relative displacements of the turbine engine 10 with respect to the pylon 32, along the axis A (see FIG. 8). This allows that no constraints are generated during the engine elongation due to the operating temperature.

In this first embodiment, the damping device 46 is of the pallet type and comprises a cage 48 secured to the link 42, and a pallet 50 secured to the link 44. The pallet 50 can rotate in a cavity 52 in the cage 48, which is filled with a damping liquid.

In the example shown, the cavity 52 of the cage 48 comprises stops 54a, 54b, 56a, 56b configured to limit the angular deflection of the pallet 50 in the cavity (see FIG. 6), and therefore the relative displacements of the turbine engine 10 with respect to the pylon 32. The pallet 50 comprises two diametrically opposed ears 50a, 50b configured to bears on the stops 54a, 54b, 56a, 56b. The ear 50a can displace between the stop 54a and the stop 54b, and the ear 50b can displace between the stop 56a and the stop 56b. A first limit position of the pallet 50 in the cavity 48 corresponds to the case where the ears 50a, 50b rest respectively on the stops 54a and 56b. A second limit position of the pallet 50 in the cavity 48 corresponds to the case where the ears 50a and 50b rest on the stops 54b and 56a respectively.

FIGS. 9a to 9d show the extreme positions of the turbine engine 10 with respect to the pylon 32, in the plane P2 in which the damper 40 extends.

In FIG. 9a, the turbine engine 10 has displaced upwards (displacement along the axis Z): Z+), and also on one side (displacement along the axis Y=Y−), opposite the pylon 32. The end 44a of the link 44, and in particular its axis of connection to the turbine engine, is located on a first corner of a square of displacement of this end in the aforementioned plane.

The length of one side of this square corresponds to the predetermined stroke displacement of the rear portion of the turbine engine relative to the pylon. This square has two parallel sides oriented in the direction Z and two parallel sides oriented along the direction Y.

In FIG. 9b, the turbine engine 10 has displaced downwards (displacement along the axis Z): Z−), and on the same side as in FIG. 9a (displacement along the axis Y: Y−), opposite the pylon 32. The end 44a of the link 44 is located on a second corner of the displacement square.

In FIG. 9c, the turbine engine 10 has displaced upwards (displacement along the axis Z): Z+), and also on an opposite side (displacement along the axis Y: Y+), opposite the pylon 32. The end 44a of the link 44 is located on a third corner of the displacement square.

Finally, in FIG. 9d, the turbine engine 10 has displaced downwards (displacement along the axis Z): Z−), and on the same side as in FIG. 9c (displacement along the axis Y: Y+), opposite the pylon 32. The end 44a of the link 44 is located on a fourth and final corner of the displacement square.

Beyond these strokes, the pallet rests on the stops of the cage to block any further displacement of the turbine engine and, if necessary, to ensure the transmission of stresses from the turbine engine to the pylon.

The liquid contained in the cavity 48 for displacing the pallet 50 may be Newtonian or non-Newtonian.

A non-Newtonian fluid is a fluid whose viscosity varies as a function of the constraint or the force applied and of the time. The most common example of a non-Newtonian fluid is cornstarch dissolved in water.

The behaviour of Newtonian fluids such as water can be described exclusively in terms of temperature and pressure. However, the physical behaviour of a non-Newtonian fluid depends on the forces acting on it over time. For example, the viscosity of certain fluids increases as the force subjected increases. They are referred to as rheo-thickening fluids. Conversely, the viscosity of certain fluids decreases when they are subjected to a force, these are rheo-fluidising fluids.

If a Newtonian liquid is used, this liquid may be an oil, a silicone liquid, water, etc.

In the preferred case of using a non-Newtonian liquid, this liquid is preferably rheo-thickening and is, for example, a fluid made up of rough grains in a liquid. When there are many more grains than liquid, at rest, the grains slide over each other and the mixture has very little viscosity. However, when a constraint is applied, the grains block the one against the others and the liquid can no longer flow between them. The mixture solidifies and its viscosity increases.

The turbine engine displaces in the directions Z and Y, as shown in FIGS. 9a to 9d, depending on the constraints applied to the stators (flight incidence, vibrations, take-off, landing, etc.).

The four maximum positions produce an angular difference between the two links 42, 44 of the damper 40. This angular difference with the non-Newtonian liquid in the cavity 48 generates several reactions:

The viscosity of the liquid remains low as the pallet 50 displaces slowly and/or a force applied by the pallet is low, A rapid movement of the pallet 50 increases the viscosity of the liquid, which dampens and limits this movement.

The use of the non-Newtonian liquid thus allows the damping rate to evolve as a function of the speed and of the stress transmitted by the pallet 50.

The invention therefore allows to protect the structure from significant loads, in particular in the case of ultimate dynamic loads (loss of a propeller vane or a ring gear portion of turbine vanes) or in the case of ultimate static manoeuvres (G/gyroscopic factor), while retaining the benefits of the suspension system chosen as a cantilever to protect the performance of the turbine engine in the nominal load cases.

FIGS. 10a and 10b illustrate a second embodiment of the damper 40, in this case of the piston 60 type.

The damper 40 comprises four links 42, 44. Two first links 42 each comprise a first end 42a hinged to the pylon 32 and two second links 44 each comprise a first end 44a hinged to the turbine engine 10.

The second ends 42b, 44b of one of the links 42 and one of the links 44 are hinged together. The second ends 42b, 44b of the other of the links 42 and the other of the links 44 are connected together by a damping device 46 with a piston 60.

The ends 42a, 44a of the links 42, 44 are preferably connected by swivel connections to each other and to the pylon 32 and to the turbine engine 10 respectively.

The damping device 46 comprises a piston 60 which is secured to the link 42, and a cylinder 62 which is secured to the link 44 and in which the piston 60 can slide. The piston 60 is able to slide in the cylinder in the aforementioned plane P2.

The cylinder 62 is filled with a damping liquid, as described above.

The stroke of the damper 40 is calculated to have a functional range and a margin with two end-of-stroke stops of the piston.

FIGS. 11a and 11b illustrate a second embodiment of the damper 40, which in this case is of the spring type, i.e. with an elastically deformable element.

The damper 40 comprises four links 42, 44. Two first links 42 each comprise a first end 42a hinged to the pylon 32 and two second links 44 each comprise a first end 44a hinged to the turbine engine 10.

The second ends 42b, 44b of one of the links 42 and one of the links 44 are hinged together. The second ends 42b, 44b of the other of the links 42 and the other of the links 44 are connected together by a damping device 46 with spring 70.

The ends 42a, 44a of the links 42, 44 are preferably connected by swivel connections to each other and to the pylon 32 and to the turbine engine 10 respectively.

The damping device 46 comprises a spring 70 which is secured to the link 42, and a guide 72 which is secured to the link 44 and in or on which the spring 70 can deform. The spring 70 is able to deform in the aforementioned plane P2.

The stroke of the damper 40 is calculated to have a functional range and a margin with two end-of-stroke stops of the spring.

FIGS. 12 and 13 illustrate other variants which involve equipping the damping device 46 with a movement sensor 80.

In FIG. 12, the damping device 46 with pallet 50 is equipped with a rotary movement sensor 80 which measures the angular deflections of the pallet 50 about its axis of rotation.

In the case shown in FIG. 13, the damping device 46 with piston 70 or spring 80 is equipped with a translation sensor 80 which measures the deflections of the piston or the deformations of the spring.

In nominal operation, the relative displacements and the vibrations of the turbine engine are damped by the damper. This is the case, for example, during normal operation of the turbine engine and manoeuvres of the aircraft. There is no transmission of stresses between the turbine engine and the pylon.

In ultimate operation, for example loss of vane and ultimate manoeuvres of the aircraft, the damper blocks and ensures a transmission of the stresses.

The invention thus proposes to position a damper 40 between the turbine engine 10 and the pylon 32 in order to:

Create a stop that would be activated only in the event of a large displacement (system dimensioned for a certain value), Limit the resonance of the cantilevered turbine engine by the damper, and Generate no stress on the cantilevered turbine engine during normal operation (limited displacement and low vibration frequency).

The invention claimed is:

1. An assembly comprising an aircraft turbine engine and a pylon for mounting the turbine engine to an element of the aircraft, the turbine engine having a longitudinal axis and comprising a gas generator comprising, from upstream to downstream, in the flowing orientation of the gases, at least one compressor, an annular combustion chamber and at least one turbine, the pylon having a generally elongate shape along said axis and comprising members for suspending the turbine engine, said members being connected to the turbine engine in at least one first plane which is perpendicular to the axis and which is located upstream of the combustion chamber so that the turbine engine is attached in a cantilever manner to the pylon, wherein the assembly further comprises at least one damper which connects the turbine engine to the pylon and which is located in a second plane perpendicular to the axis located downstream of the combustion chamber, said at least one damper being configured to limit the relative displacements in said second plane between the turbine engine and the pylon, wherein the at least one damper comprises at least two links, a first link comprising a first end hinged to the pylon and a second link comprising a first end hinged to the turbine engine, the first and second links comprising second ends which are connected together by a damping device, the first and second ends of the links having hinge axes parallel to each other and to the longitudinal axis of the turbine engine.

2. The assembly according to claim 1, wherein said at least one damper is configured to limit the displacements in said second plane over a first predetermined stroke in a first direction contained in said second plane, and over a second predetermined stroke in a second direction contained in said second plane and perpendicular to the first direction, and to block any displacement of the turbine engine relative to the pylon beyond these strokes.

3. The assembly as claimed in claim 1, wherein the first ends of the links are connected by swivel connections to the pylon and to the turbine engine respectively.

4. The assembly according to claim 1, wherein the damping device is of the pallet type and comprises a cage secured to one of the first and second links, and a pallet secured to the other of the first and second links, the pallet being able to rotate in a cavity of the cage, which is filled with a damping liquid.

5. The assembly as claimed in claim 4, wherein the damping liquid is a non-Newtonian liquid.

6. The assembly as claimed in claim 4, wherein the damping liquid is a Newtonian liquid.

7. The assembly according to claim 4, wherein the cavity of the cage comprises stops configured to limit the angular deflection of the pallet in the cavity.

8. The assembly according to claim 7, wherein the pallet comprises two diametrically opposed ears configured to bear on said stops.

9. The assembly according to claim 1, wherein the damping device is of the piston or spring type.

10. The assembly according to claim 1, wherein the damping device is equipped with a movement sensor.

* * * * *